United States Patent
Fischer

(10) Patent No.: US 7,178,452 B2
(45) Date of Patent: Feb. 20, 2007

(54) ESPRESSO MACHINE HAVING A ROTATING CERAMIC DISK VALVE AS A SELECTIVE WATER/STEAM DISTRIBUTOR

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 446 days.

(21) Appl. No.: 10/347,513

(22) Filed: Jan. 21, 2003

(65) Prior Publication Data

US 2003/0150333 A1 Aug. 14, 2003

Related U.S. Application Data

(63) Continuation of application No. 10/263,352, filed on Oct. 3, 2002, now abandoned.

(30) Foreign Application Priority Data

Oct. 4, 2001 (DE) ................ 101 48 931

(51) Int. Cl.
*A47J 31/46* (2006.01)
(52) U.S. Cl. .............. 99/280; 99/293; 99/300; 99/302 R; 137/625.46; 137/636.1
(58) Field of Classification Search ............ 99/293, 99/300, 295, 299, 302 R, 280; 137/595, 137/863, 636.1, 625.46; 251/331
See application file for complete search history.

(56) References Cited

U.S. PATENT DOCUMENTS

| | | | |
|---|---|---|---|
| 1,822,433 A | 9/1931 | Brand | |
| 4,632,024 A * | 12/1986 | Cortese | 99/293 |
| 4,947,738 A * | 8/1990 | Eugster | 99/293 |
| 5,207,149 A | 5/1993 | Weber | |
| 5,256,174 A * | 10/1993 | Kai et al. | 96/116 |

FOREIGN PATENT DOCUMENTS

| | | |
|---|---|---|
| DE | 24 24 867 C2 | 3/1975 |
| DE | 42 03 088 A | 10/1992 |
| EP | 1 106 126 A | 6/2001 |
| JP | 61-234212 | * 10/1986 |

OTHER PUBLICATIONS

Brockhaus (www.brockhaus de), undated.
www.cae Fln Manheim, undated.

* cited by examiner

*Primary Examiner*—Reginald L. Alexander
(74) *Attorney, Agent, or Firm*—Venable LLP; Robert Kinberg; Steven J. Schwarz

(57) ABSTRACT

An espresso machine provided with a rotating ceramic disk valve (1) as a selective water-steam distributor that is in a driving connection with a drive motor (2), and a control device (3) for controlling the drive motor (2). To increase the precision of the rotational-angle setting, a Geneva gear (4) is incorporated into the driving connection between the drive motor (2) and the rotating ceramic disk valve (1), with the gear setting the rotating ceramic disk valve (1) in make-and-break cycles. The control device (3) shuts off the drive motor (2) after at least one make-and-break cycle of the Geneva gear (4).

4 Claims, 1 Drawing Sheet

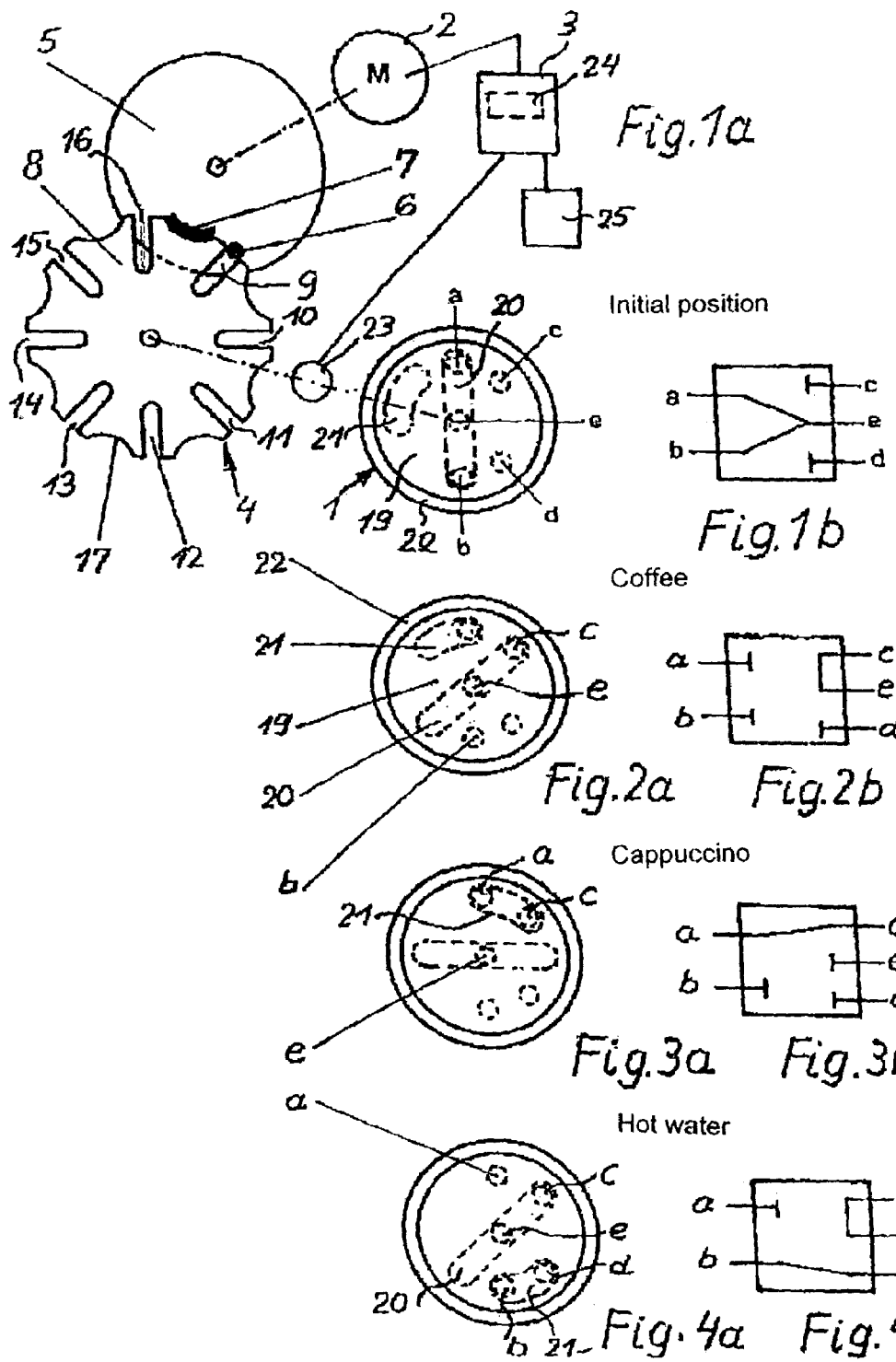

ESPRESSO MACHINE HAVING A ROTATING CERAMIC DISK VALVE AS A SELECTIVE WATER/STEAM DISTRIBUTOR

BACKGROUND OF THE INVENTION

This application is a continuation of U.S. patent application No. 10/263,352, filed Oct. 3, 2002.

This application claims the priority of German Patent Application No. 101 48 931.5 filed Oct. 4, 2001 which is incorporated herein by reference.

The invention relates to an espresso machine having a rotating ceramic disk valve as a selective water/steam distributor. More specifically, the present invention relates to an espresso machine having a rotating ceramic disk valve as a selective water-steam distributor that is in a driving connection with a drive motor, and a control device for controlling the drive motor.

Known espresso machines are typically designed not only for preparing espresso, but also milk froth for cappuccino or hot water for various uses. For this purpose, these espresso machines have manually- or program-controlled valves that connect a hot-water generator or a steam generator to the respective functional element, such as a nozzle for discharging hot water. Instead of comprising an arrangement of magnetically controlled individual valves, more modern machines are preferably equipped with rotating ceramic disk valves and formed as multi-directional valves. Such valves can connect a selected discharge line of, for example, a hot-water generator or a steam generator, to a line supplying a functional element, such as a nozzle, depending on the rotational-angle position. The ceramic disk valves essentially comprise a stationary ceramic disk having flow-through openings, to which the supply and discharge lines of the liquid or gaseous medium to be controlled are permanently connected; a second rotating ceramic disk, which is concentric relative to the stationary ceramic disk and rests, spring-loaded, tightly against the first disk; and connecting conduits. The second rotating ceramic disk, when in certain rotational-angle positions, connects the selected supply- and discharge-line openings to one another. A drive motor that serves to set the ceramic disk valve can be controlled either manually or, in automatic operation, by a program switch mechanism, i.e., a control device.

In one known espresso machine, which has a rotating ceramic disk valve as its selective water distributor, but is otherwise of the generic type mentioned at the outset, a driving pinion keeps an electric drive motor in direct gear engagement with a serrated disk that is connected to the rotating ceramic disk of the disk valve (EP 1 106 126 A1). To attain a very high precision in setting the angle of rotation of the rotating ceramic disk, a stepping motor can be provided as the drive motor. The control of the stepping motor, which requires a number of individual pulses for adjusting the disk valve, may be very complicated and may not produce the desired result, for example, because the stepping motor does not follow all of the pulses of the controlled operating voltage during the startup procedure, and/or is slow during the shutoff process because of the moment of inertia of the disk valve connected to it and the gear elements. The latter disadvantage is even more prevalent in simpler drive motors, for example, in a synchronous motor or a universal motor in place of the stepping motor, even if the drive motor is switched off, cam-controlled, in a desired rotational position of the rotating ceramic disk.

Attaining an exact rotational-angle position of the rotating ceramic disk of the disk valve, and thus a fast, exact alignment of the openings in the disk valve that are to be connected to one another, is usually desirable for assuring reliably uniform flow quantities and avoiding interfering flow noises, which may occur at hole edges if the openings are not perfectly aligned.

It is therefore the object of the present invention to provide an espresso machine having a rotating ceramic disk valve as a selective water/steam distributor, such that the precision of the adjustment of the rotational angle of the disk valve is improved in a simple manner.

SUMMARY OF THE INVENTION

The above object generally is achieved according to the invention by an espresso machine having a rotating ceramic disk valve as a selective water-steam distributor that is in a driving connection with a drive motor, and having a control device for controlling the drive motor; and wherein: a Geneva gear is incorporated into the driving connection between the drive motor and the rotating ceramic disk valve, with the gear setting the position of the rotating ceramic disk valve in make-and-break cycles, and the control device switches off the drive motor after at least one make-and-break cycle of the Geneva gear.

The incorporation of a Geneva gear into the driving connection between the drive motor and the rotating ceramic disk valve ensures that the rotating disk valve will be adjusted quickly and exactly into the exact switching position, that is, the rotational-angle position of the rotating ceramic disk that is part of the disk valve is adjusted. The adjustment is effected in predetermined make-and-break cycles, corresponding to the embodiment of the Geneva gear. Accordingly, the control for the drive motor need only be designed such that the desired make-and-break cycles are traversed, not a continuous rotational region between switching positions of the disk valve.

To realize the invention, namely that the Geneva gear includes a Geneva disk, a disk having radial drive slots, as well as a rotating drive element that is connected to the drive motor. The drive element has a drive pin, and is formed such that the drive pin carries the Geneva disk along by one make-and-break cycle when the drive element rotates. Over the course of only a portion of a revolution of the drive element, the drive pin extends into one of the drive slots. The Geneva disk has a fixing latch between two respective drive slots, and a fixing element engages in the rotational positions of the Geneva disk and the drive element at the end of a respective make-and-break cycle.

Because the Geneva disk is latched through the engagement of the fixing element and one of the fixing latches at the end of a make-and-break cycle, the Geneva disk stops spinning at the end of the make-and-break cycle. A slowing of the drive motor therefore does not affect the Geneva disk, because, at the rotating drive element, the drive pin is disengaged from the radial drive slot that effected the drive of the Geneva disk prior to the end of the make-and-break cycle. It is pointed out here that a drive slot is cut into the Geneva disk for each make-and-break cycle. Thus, a desired setting or rotational-angle position of the rotating ceramic disk valve can correspond to each make-and-break cycle, or a plurality of make-and-break cycles, of the Geneva disk. The Geneva disk is preferably connected directly to the rotating ceramic disk valve, that is, to its rotating ceramic disk.

For the desired setting of the rotating ceramic disk valve, the respective position of the Geneva disk can be ascertained with a memory in the control device as a reference for a setting change of the disk valve. Instead of the rotational-position information of the disk valve or the Geneva disk, an rpm of the drive element may be used, because the drive element performs one full revolution to attain a respective make-and-break cycle of the drive element.

As an alternative, the control can include a resetting device, with which the Geneva disk is automatically reset prior to a setting change. When a setting change occurs, the make-and-break cycles are traversed and simply counted, starting from a zero position of the Geneva disk. The control device can be used to reversibly select the direction of rotation of the drive motor and the Geneva gear, with a latching function, and while maintaining the exact adjustment in make-and-break cycles, which permits the desired setting of the disk valve to be attained faster in certain setting situations. This creates an effective, program-controlled multi-directional valve for espresso machines that operates independently of the direction of rotation.

The invention is described below with reference to a drawing having five figures, with FIGS. 1a, 1b 2a, 2b; 3a, 3b; and 4a being respectively associated. Details about the features of the invention, and further advantageous effects, ensue from the description below.

BRIEF DESCRIPTION OF THE DRAWINGS

FIG. 1a is a schematic representation of a drive of a rotating ceramic disk valve, in an initial position.

FIG. 1b is a valve symbol associated with the initial valve position of FIG. 1a.

FIG. 2a shows the rotating ceramic disk valve in a first setting position, for preparing coffee.

FIG. 2b shows the valve symbol associated with the first setting position of FIG. 2a.

FIG. 3a shows the rotating ceramic disk valve in a second setting position, for preparing cappuccino;

FIG. 3b shows the valve symbol associated with the second setting position of FIG. 3a.

FIG. 4a shows the rotating ceramic disk valve in a third setting position, for preparing hot water. Figure FIG. 4b shows the valve symbol associated with the third setting position of FIG. 4a.

DESCRIPTION OF THE PREFERRED EMBODIMENTS

FIG. 1a illustrates a universal, electric drive motor 2 for setting a rotating ceramic disk valve, which is generally characterized by the reference numeral 1. The motor 2 is supplied with electrical power by a control or control device 3. The drive motor 2 sets the rotating ceramic disk valve 1 in various rotational-angle positions—initial position, first through third position settings—using a Geneva gear generally represented by 4.

The Geneva gear essentially comprises a rotating drive element 5, which is; formed as a disk here, and supports a drive pin 6 at its periphery. A fixing element 7 is further mounted to the drive element 5 or disk, near the drive pin 6. A Geneva disk 8 is disposed next to the disk-shaped, rotating drive element 5, with their axes extending parallel. The Geneva disk 8 has radially extending drive slots 9 through 16, which are disposed equidistantly about the circumference of the disk 8. The rotating drive element 5 and the Geneva disk 8 are adjacent, so the drive pin 6 can extend into one of the drive slots, for example, the slot 9, and the Geneva disk 8 can rotate with the drive pin 6, until one make-and-break cycle has been traversed and the pin has left the respective drive slot, e.g., 9, and therefore can transmit no further rotational movements onto the Geneva disk 8. FIG. 1a illustrates the latter situation. The drive element 5 has completed a full revolution during this make-and-break cycle.

To halt the movement of the Geneva disk 8 after a make-and-break cycle has been completed, an arched fixing latch 17 is cut out of the circumference of the Geneva disk 8, for example, between two adjacent drive slots 11, 12. The latch 17 is detachably fixed with a fixing element 18 mounted to the drive element 5, near the drive pin 6. At the beginning of the next make-and-break cycle, the fixing element 18 slips out of the fixing latch 17 and performs a complete revolution with the drive element 5, until it can engage the next fixing latch 17.

Thus, a complete revolution of the drive element 5 is required for each make-and-break cycle of the Geneva disk 8. The number of drive slots 9 through 16 of the Geneva disk 8 determines the number of provided make-and-break cycles. In the present case, eight make-and-break cycles can be realized. One position of the disk valve is allocated to each make-and-break cycle in a direct coupling with the rotating ceramic disk valve 1. It is also conceivable, however, that not every possible position of the disk valve will be utilized.

In FIG. 1a, the rotating ceramic disk valve 1 is in its initial position. In this instance, a rotating ceramic disk 19 of the disk valve, in which connecting conduits 20, 21 are formed, is located opposite a stationary ceramic disk 22, which has an opening a for the entrance of steam, an opening b for the entrance of hot water, an opening c for the exit of steam, and an opening d for the exit of hot water. The openings a and b for the entrance of steam and hot water, respectively, communicate with a flow-through opening e in the stationary ceramic disk 22, for example, in the center as shown, via the conduit 20. The openings c and d for the exit of steam and hot water, respectively, are blocked in this position of the disk 19. The flow-through opening e is provided for allowing the steam or hot water to escape.

In a further rotational position of the rotating disk valve, after the Geneva gear has traversed a make-and-break cycle, the disk valve is located in the first setting position, for preparing coffee. Here, the opening c for the exit of steam is connected to the flow-through opening e via the conduit 20, while all of the other openings are blocked.

In a second setting position of the disk valve, for preparing cappuccino, after the Geneva gear has traversed a further make-and-break cycle, the connecting conduit 21 connects the opening a for the entrance of steam and the opening c for the exit of steam to one another, while all of the other openings are blocked.

In a third setting position of the disk valve, for preparing hot water, after the Geneva gear 19 has traversed two further make-and-break cycles, the opening b for the entrance of hot water and the opening d for the exit of hot water are connected to one another via the conduit 21. The opening c for the exit of steam is connected to the flow-through opening e via the connecting conduit 20. The opening a for the entrance of steam is blocked.

The control device 3 is based on a make-and-break cycle that is defined by the Geneva gear 4 as a counter unit. That is, more finely graduated units are not required, because the Geneva gear assures the desired precision of the setting of the rotating disk valve 1. In a first embodiment of the control device 3, shown schematically in FIG. 1a, the control for the complete revolution that the drive element 5 must traverse for a respective make-and-break cycle can be effected by the detection of the respective position of the Geneva disk 8 or the drive element 5 by a position sensor 23, which is coupled to the Geneva disk 8 or, alternately, to the drive element 5. The rotational position detected in this manner, which is identical here to a rotational position of the rotating disk valve 1, and in which drive elements between the Geneva disk 8 and the disk valve 1 can be omitted, can be stored with a memory 24 in the control device. A new desired rotational setting or position of the disk valve for a specific function can be preset in the control device with a manually actuated setting device 25. Hence, it is possible to effect any desired positioning of the Geneva disk, and the ceramic disk valve, starting from the last position of the Geneva disk. As an alternative, the control device can be designed such that the Geneva disk 8 automatically returns to its initial position following a completed work cycle, and the setting device 25 initiates each new selection from the initial position.

In both variations of the control device, it can be advantageous for the control device and the elements that it controls, that is, the Geneva gear with the latching provision, to be reversible. If this is the case, a new rotational position of the Geneva gear or the rotating disk valve can be set on the shortest paths and in the shortest amount of time if the control device includes a preset logic for identifying the shortest switching path.

The invention now being fully described, it will be apparent to one of ordinary skill in the art that many changes and modifications can be made thereto without departing from the spirit or scope of the invention as set forth herein.

What is claimed is:

1. In an espresso machine having a rotating ceramic disk valve as a selective water-steam distributor, a drive motor connected to the ceramic disk valve via a driving connection to rotate the ceramic disk valve to a desired angular positioning, and a control device for controlling the drive motor, the improvement comprising:

a Geneva gear incorporated into the driving connection between the drive motor and the rotating ceramic disk valve, with the Geneva gear setting the position of the rotating ceramic disk valve in make-and-break cycles, and the control device including means for switching off the drive motor after at least one make-and-break cycle of the Geneva gear, wherein the Geneva gear includes:

a Geneva disk having a plurality of radially extending drive slots distributed about its circumference, a rotating drive element connected to the drive motor and having a drive pin formed such that the drive pin extends into one of the drive slots over the course of only a portion of a revolution of the drive element and carries the Geneva disk along for one make-and-break cycle when the drive element rotates, a fixing latch disposed on the circumference of the Geneva disk between each two respective adjacent drive slots, and a fixing element disposed on the drive element and engaging a respective latch in the rotational positions of the Geneva disk when a make-and-break cycle ends.

2. The espresso machine according to claim 1, wherein the control device has a memory for rotational-position information pertaining to at least one of the positions of the disk valve, the position of the Geneva disk, and the rpm of the drive element, as a reference for a setting position change for the disk valve.

3. The espresso machine according to claim 1, wherein the control device includes a resetting device, with which the Geneva disk is automatically reset prior to a setting position change of the valve.

4. The espresso machine according to claim 1, wherein the control device includes means for reversing the direction of rotation of the drive motor and the Geneva gear.

* * * * *